US010169487B2

(12) United States Patent
Atasu et al.

(10) Patent No.: US 10,169,487 B2
(45) Date of Patent: Jan. 1, 2019

(54) GRAPH DATA REPRESENTATION AND PRE-PROCESSING FOR EFFICIENT PARALLEL SEARCH TREE TRAVERSAL

(71) Applicant: International Business machines Corporation, Armonk, NY (US)

(72) Inventors: Kubilay Atasu, Horgen (CH); Silvio Dragone, Winterthur (CH); Christoph Hagleitner, Wallisellen (CH); Robert R. McCune, Notre Dame, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

(21) Appl. No.: 15/090,071

(22) Filed: Apr. 4, 2016

(65) Prior Publication Data

US 2017/0288990 A1  Oct. 5, 2017

(51) Int. Cl.
 G06F 15/173 (2006.01)
 G06F 17/30 (2006.01)
(52) U.S. Cl.
 CPC .............. G06F 17/30961 (2013.01)
(58) Field of Classification Search
 CPC .................................................. G06F 17/30961
 USPC ................... 709/224, 223, 200, 252
 See application file for complete search history.

(56) References Cited

U.S. PATENT DOCUMENTS

| 8,234,233 | B2 | 7/2012 | Zhou | |
| 8,395,622 | B2 | 3/2013 | Modani | |
| 8,543,648 | B1 | 9/2013 | Rhodes et al. | |
| 8,914,320 | B2 | 12/2014 | Hanner et al. | |
| 2003/0179742 | A1* | 9/2003 | Ogier | H04L 1/1614 370/351 |
| 2004/0062263 | A1* | 4/2004 | Charcranoon | H04Q 11/0066 370/431 |
| 2008/0153444 | A1* | 6/2008 | Chen | H04L 1/0047 455/205 |
| 2009/0315890 | A1* | 12/2009 | Modani | G06Q 10/10 345/440 |
| 2015/0293994 | A1 | 10/2015 | Kelly | |

OTHER PUBLICATIONS

Acar et al., "Data Structures and Algorithms for Robust and Fast Parallel Graph Search." (13 pgs). 2014.
Nan Du et al.,"A Parallel Algorithm for Enumerating All Maximal Cliques in Complex Network." National Science Foundation of China under grant No. 60402011and the co-sponsoredproject of Beijing Committee of Education SYS100130422. (5 pgs). 2014.

* cited by examiner

*Primary Examiner* — Liang Che A Wang
(74) *Attorney, Agent, or Firm* — Cantor Colburn LLP; Daniel Morris

(57) ABSTRACT

One or more embodiments may provide the capability to enumerate maximal cliques of graph data by constructing and traversing a search tree through a single sequential pass on an adjacency list. The adjacency list may be generated so as to enable the at least one maximal clique to be generated in one single sequential pass.

17 Claims, 12 Drawing Sheets

GRAPH DATA REPRESENTATION AND PRE-PROCESSING FOR EFFICIENT PARALLEL SEARCH TREE TRAVERSAL

BACKGROUND

One or more embodiments of the present invention relate to techniques for enumerating maximal cliques of graph data by constructing and traversing a search tree through a single sequential pass on an adjacency list. The adjacency list may be generated so as to enable the at least one maximal clique to be generated in one single sequential pass.

A graph data structure is a technique for operating a computer system so as to represent data values as a set of nodes (also known as vertices or points), together with a set of connections or definitions of pairs of these nodes. These pairs are known as edges (also arcs or lines). Graph traversal (also known as graph search) is a technique for operating a computer system so as to visit, access, check and/or update each node in a graph. Such traversals may be classified by the order in which the vertices are visited.

Graph traversal or search can be a very resource intensive computing process. Conventional traversal techniques typically require random access to graph data structures or multiple passes on the graph data. Accordingly, a need arises for a technique that provides improved performance and reduced resource requirements.

SUMMARY

Embodiments of the present invention may provide the capability to enumerate maximal cliques of graph data by constructing and traversing a search tree through a single sequential pass on an adjacency list. The adjacency list may be generated so as to enable the at least one maximal clique to be generated in one single sequential pass.

According to one or more embodiments of the present invention, a method for maximal clique enumeration of graph data may comprise receiving data representing a graph comprising a plurality of nodes and a plurality of edges connecting at least some of the nodes, generating at least one adjacency list specifying nodes that are neighbors of a node based on the received data representing the graph, and generating, based on the at least one adjacency list, at least one maximal clique specifying at least one set of nodes in which every node is connected to every other node and to which no additional node can be added with every node still being connected to every other node.

The at least one maximal clique may be generated by constructing and traversing a search tree through a single sequential pass on the at least one adjacency list. The at least one adjacency list may be generated so as to enable the at least one maximal clique to be generated in one single sequential pass.

The at least one maximal clique may be generated by for each adjacency list of a root node, generating a first child set and a non-first child set, wherein each first child set and a non-first child set comprises a first set of chosen nodes, a second set of nodes that may be chosen, and a third set of nodes that cannot be chosen, repeating until no first child sets and no non-first child sets remain selecting a first child set or a non-first child set of a selected node that is a neighbor of the root node, attempting to generate a new first child set for the selected node by moving at least one node from the second set of nodes to the first set of nodes, attempting to generate a new non-first child set for the selected node by moving at least one node from the second set of nodes to the third set of nodes, and when a new first child set or a new non-first child set is generated in which both the second set of nodes and the third set of nodes are empty, outputting the first set of nodes as a maximal clique. The at least one adjacency list may be generated by generating for a node, a set of nodes including the node and all neighboring nodes, generating an ordering of the set of nodes including the node and all neighboring nodes by performing a breadth-first search on the data representing the graph by selecting neighbors of nodes that have already been selected, and reordering nodes in the at least one adjacency list based on the generated ordering of the set of nodes.

The at least one maximal clique may be generated by for each adjacency list of a root node, generating a first child set of nodes of the same level as the root node, a non-first child set of nodes of the same level as the root node, a first child set of nodes of the next level from the root node, a non-first child set of nodes of the next level from the root node, wherein each first child set and a non-first child set comprises a first set of chosen nodes, a second set of nodes that may be chosen, and a third set of nodes that cannot be chosen, repeating until no first child sets and no non-first child sets remain selecting a first child set or a non-first child set of a selected node that is a neighbor of the root node, wherein when the level of the selected node is the same as the level of the root node, the first child set of nodes of the same level as the root node and the non-first child set of nodes of the same level as the root node are selected from, and when the level of the selected node is the next level from the level of the root node, the first child set of nodes of the next level from the root node and the non-first child set of nodes of the next level from the root node are selected from, attempting to generate a new first child set for the selected node by moving at least one node from the second set of nodes to the first set of nodes, attempting to generate a new non-first child set for the selected node by moving at least one node from the second set of nodes to the third set of nodes, and when a new first child set or a new non-first child set is generated in which both the second set of nodes and the third set of nodes are empty, outputting the first set of nodes as a maximal clique. The at least one adjacency list may be generated by generating for a node, a set of nodes including the node and neighboring nodes that are of the same level of the node or are of the next level from the node, and not including neighboring nodes of an earlier level or neighboring nodes of the same level but having an earlier ordering, generating an ordering of the set of nodes including the node and neighboring nodes by performing a breadth-first search on the data representing the graph by selecting neighbors of nodes that have already been selected, and reordering nodes in the at least one adjacency list based on the generated ordering of the set of nodes.

According to one or more embodiments of the present invention, apparatus for maximal clique enumeration of graph data may comprise a plurality of processing kernels, each processing kernel comprising processing circuitry, input memory configured to store input to the processing kernel, output memory configured to store output from the processing kernel, and a plurality of intermediate memories configured to store intermediate processing data, wherein the processing circuitry may be configured to receive data representing a graph comprising a plurality of nodes and a plurality of edges connecting at least some of the nodes, generate at least one adjacency list specifying nodes that are neighbors of a node based on the received data representing the graph, and generate, based on the at least one adjacency list, at least one maximal clique specifying at least one set of nodes in which every node is connected to every other node and to which no additional node can be added with every node still being connected to every other node.

BRIEF DESCRIPTION OF THE DRAWINGS

The details of one or more embodiments of the present invention, both as to its structure and operation, can best be understood by referring to the accompanying drawings, in which like reference numbers and designations refer to like elements.

DETAILED DESCRIPTION

One or more embodiments of the present invention may provide the capability to search for patterns in large graphs by dynamically constructing a search tree and scheduling the traversal of this search tree on a parallel architecture, such as an FPGA or a GPU. One or more embodiments may include the definition of a new graph data representation and a preprocessing method to derive this new data representation, which then enable construction and traversal of the search tree via a single pass on the graph data.

A graph is a collection of nodes and edges (or vertices and links, or circles and lines) where edges connect two nodes. In a graph, a clique is a set of nodes where every node is connected to every other node. A clique is maximal when no other node can be added to the set such that the set would retain the clique property. Maximal clique enumeration involves listing all maximal cliques in a graph. A well-known method for determining maximal cliques is known as the Bron-Kerbosch method.

Figure 1:
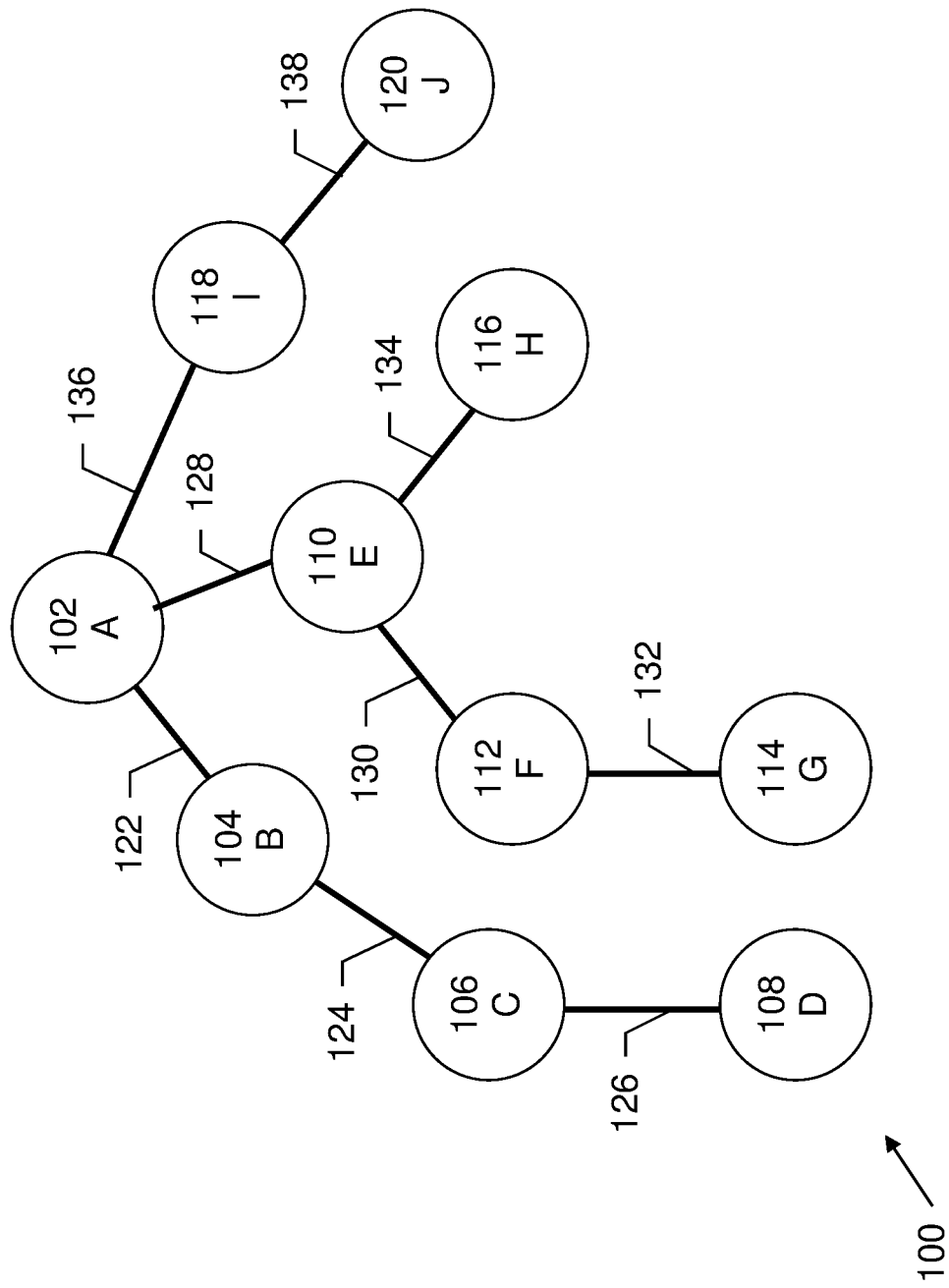
FIG. 1 is an exemplary diagram of a graph.

Graph traversal is a technique to systematically explore every node in a graph. An example of a graph 100 is shown in FIG. 1. Graph 100 includes a plurality of nodes A-J 102-120, and a plurality of edges 122-138. Among the common forms of graph traversal are depth-first search and breadth-first search.

Figure 2:
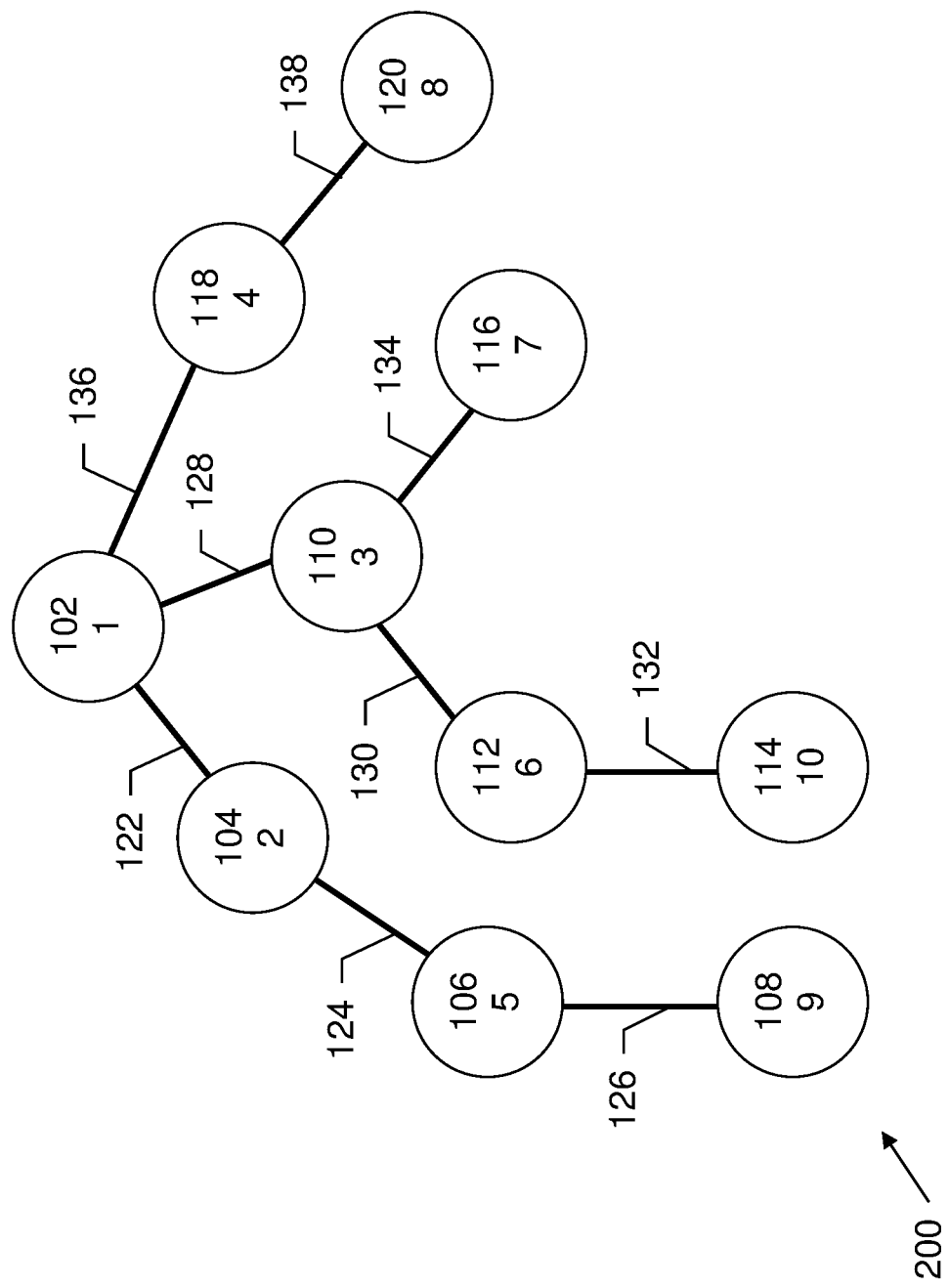
FIG. 2 is an exemplary diagram of a breadth-first search of a graph.

An example of breadth-first search 200 is shown in FIG. 2. In this example, the order in which the nodes 102-120 are traversed is shown by the numbers in the nodes. In breadth-first search, starting from the chosen root node 102, every neighbor of the root node 104, 110, 118 is systematically explored (i.e. breadth of 1), then next, every neighbor of the root's neighbors 106, 112, 116, 120 is explored (i.e. breadth of 2).

Lexicographic Breadth-first Search (LexBFS) is a specific type of breadth-first search. LexBFS is similar to a general breadth-first search, but is more restrictive. Whereas breadth-first search chooses nodes of a given breadth at random, LexBFS chooses nodes that are neighbors of nodes already chosen, adhering to a strict ordering based on the order of previously chosen nodes. For a given graph and root node, there can be multiple LexBFS orderings. Any LexBFS ordering is a breadth-first search ordering, but not vice versa. The relationship between LexBFS ordering and cliques is significant, as, for chordal graphs, LexBFS produces a perfect elimination ordering. While embodiments are not restricted to chordal graphs, many embodiments may take advantage of this property.

Figure 3:
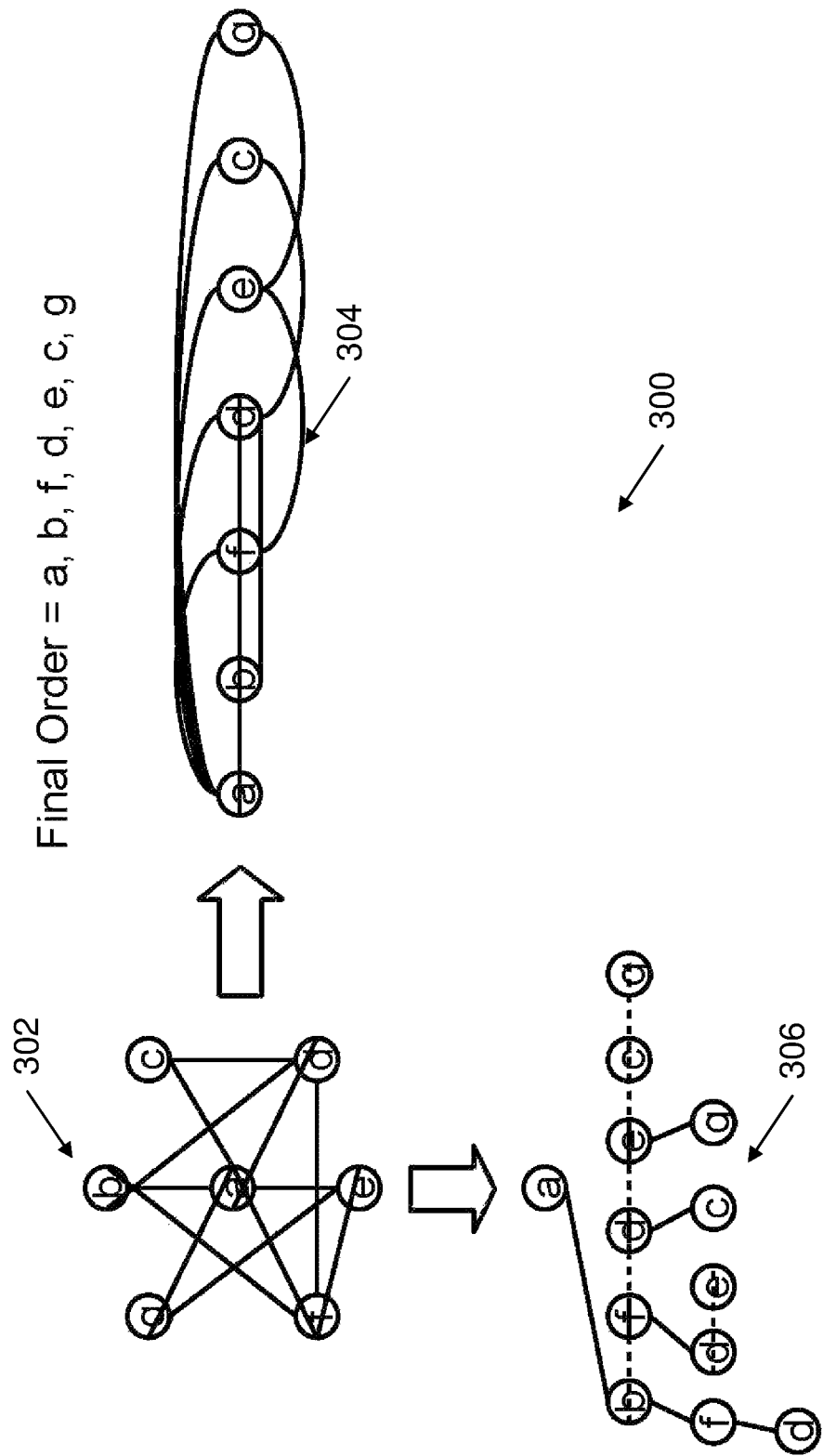
FIG. 3 is an exemplary diagram of a LexBFS processing of a graph.

An example of LexBFS processing 300 is shown in FIG. 3. For every node in graph 300, create a set of nodes 304 including the given node and all of its neighbors. That is, for a graph G=(V, E) where the number of vertices |V|=n and number of edges |E|=m, for each vertex v in |V|, build a set of nodes S={v∪N(v)} where N(v)=all neighbors of v. This results in n sets, where for a given set I in n, size of the set $|S_i|=1+\deg(v_i)$, where $\deg(v_i)$ is the degree of a given vertex. LexBFS may be run on the subgraph induced by each set. This ordering allows each set to be processed in a single pass. Processing each set $S_i$ including $v_i$ $N(v_i)$ with Bron-Kerbosch processing 306 will yield all maximal cliques rooted at vertex $v_i$, where "rooted" means that the vertex ID of $v_i$ (which is i) is the smallest ID in the maximal clique.

Figure 4:
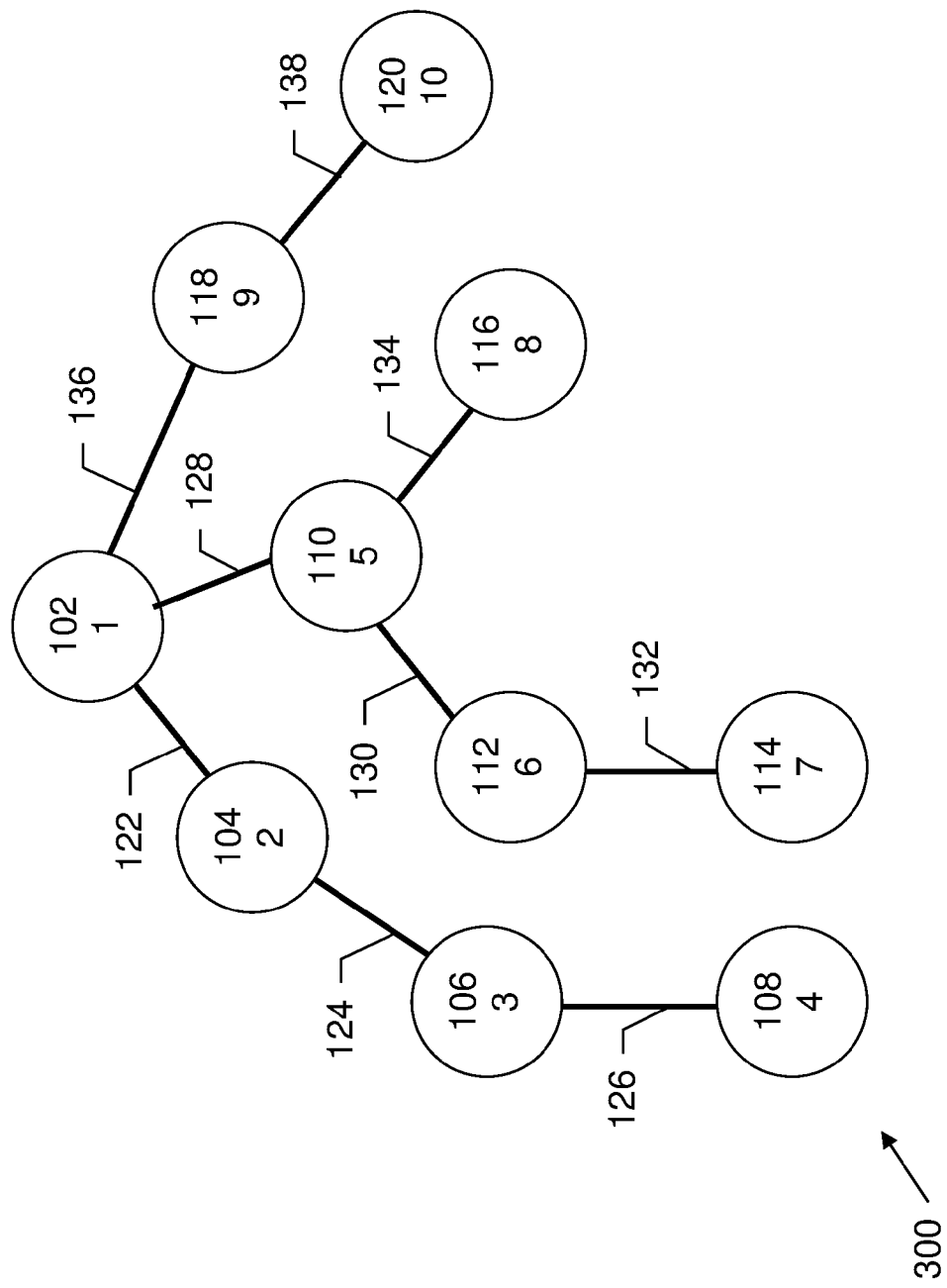
FIG. 4 is an exemplary diagram of a depth-first search of a graph.

An example of depth-first search 400 is shown in FIG. 4. In this example, the order in which the nodes 102-120 are traversed is shown by the numbers in the nodes. Depth-first search, instead of exploring all neighbors, picks a neighbor 104 of root node 102 and explores it, then picks a neighbor 106 of that neighbor, and so on until there are no more options, and then backtracks to a previous node 110 which has unexplored neighbors. The Bron-Kerbosch method uses depth-first search to find all maximal cliques in a graph.

The Bron-Kerbosch method finds all maximal cliques in a graph by performing depth-first search from every node. For n nodes, depth first search is performed from each node, for a total of n depth-first searches. While performing a depth-first search, the method stores information in three sets: the set R stores selected vertices, the set P stores candidate vertices, and set X stores vertices that cannot be chosen. During the depth-first search, vertices are placed into sets depending on the current state. A maximal clique is found when set R is non-empty, while sets P and X are empty.

In one or more embodiments, parallelization of the Bron-Kerbosch method may be performed. Parallel means using multiple processors to solve a problem by performing multiple computations at the same time. In this case, parallelism is achieved by performing a plurality of graph traversals at the same time. Moreover, the method is what is known as "embarrassingly parallel" because the information provided to each processor, and the result of each processor, is independent of other processors. A unit that performs computation may be termed a "kernel." To process a graph with n nodes and k kernels, each kernel may be assigned n/k input sets. A kernel may have one or more processing elements. A kernel may utilize multiple processing elements when queued BK sets have the same $p_0$, but relative order of the BK sets must be preserved. That is, if two BK sets have the same $p_0$ and are to be processed by two processing elements in the same kernel, the BK set that occurs earlier in the queue must have its outputs written before the later-occurring BK set. With similar coordination, BK sets with different p0 values can be processed in parallel when the adjacency list of the two p0 values occur sequentially in the input queue.

Figure 5:
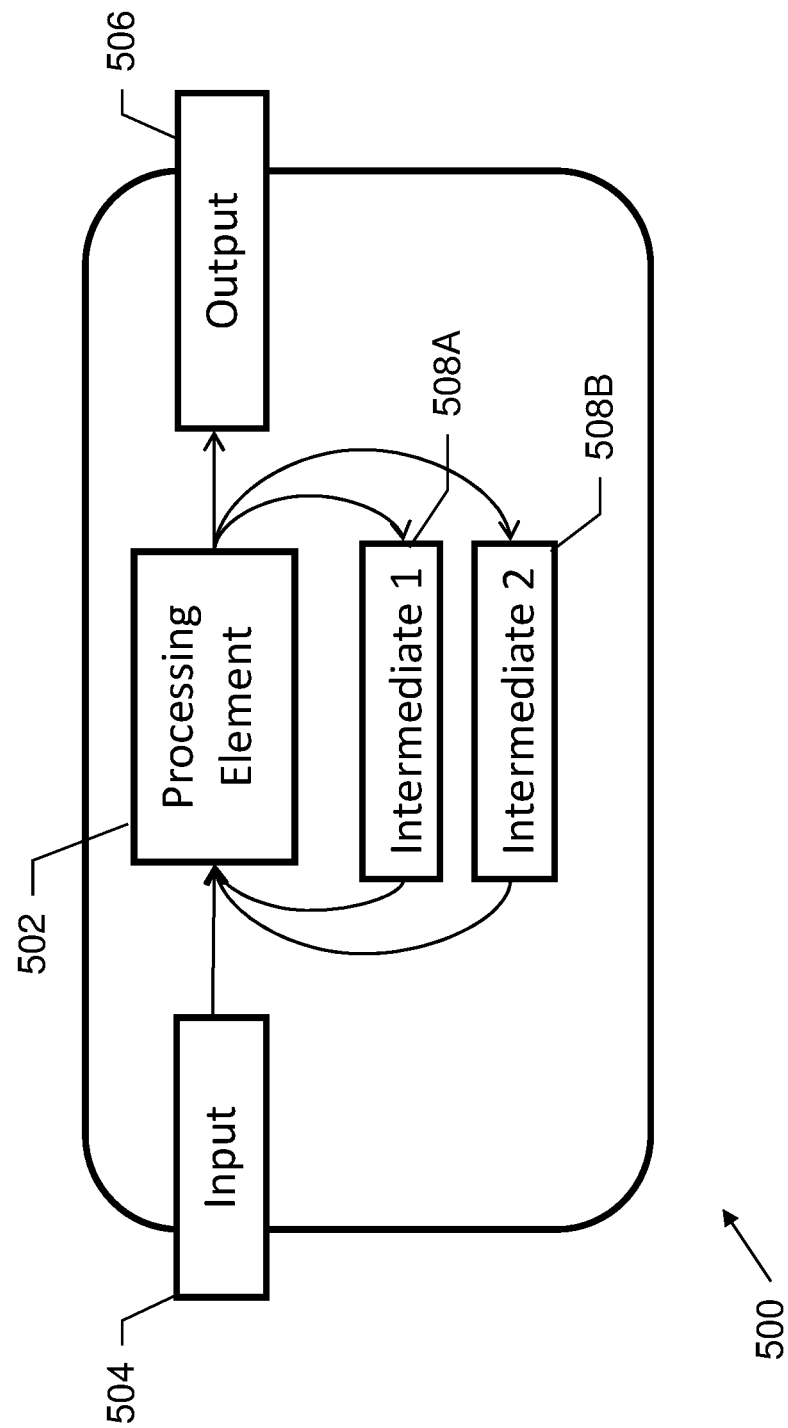
FIG. 5 is an exemplary block diagram of a processing kernel.

An example of a processing kernel 500 is shown in FIG. 5. In this example, kernel 500 may include all components necessary to perform a desired computation, including the processor 502, input buffer 504, output buffer 506, a number of intermediate buffer 508A-B. In this example, input buffer 504 may be organized as a stack and intermediate buffer 508A-B may be organized as queues. A parallel system may have many kernels, and an embarrassingly parallel system has no interaction between kernels. Typically, the results of each kernel are aggregated.

Each kernel may perform one (or more) graph traversals. All the data required to perform the traversal is provided as input to the kernel input buffer. While the whole graph may be large, for a given node v, only the neighbors of v can form a clique with v. Moreover, in addition to the neighbors of v, only the neighbors of neighbors (2-hop neighbors) of v are necessary to determine all cliques with v. So while the graph may be large, only 2-hop neighbor information (as well as the root node, and neighbors of the root node) is required as input to each kernel.

In one or more embodiments, random access of the data may be avoided by i) preprocessing the data that is provided as input to each kernel, which leads to ii) streaming computation with two intermediate buffers 508A-B. The preprocessing of the data results in a specific type of ordering that allows for the kernel to process each element one after the other. The preprocessing may be termed a Lexicographic Breadth-first Search.

Figure 6:
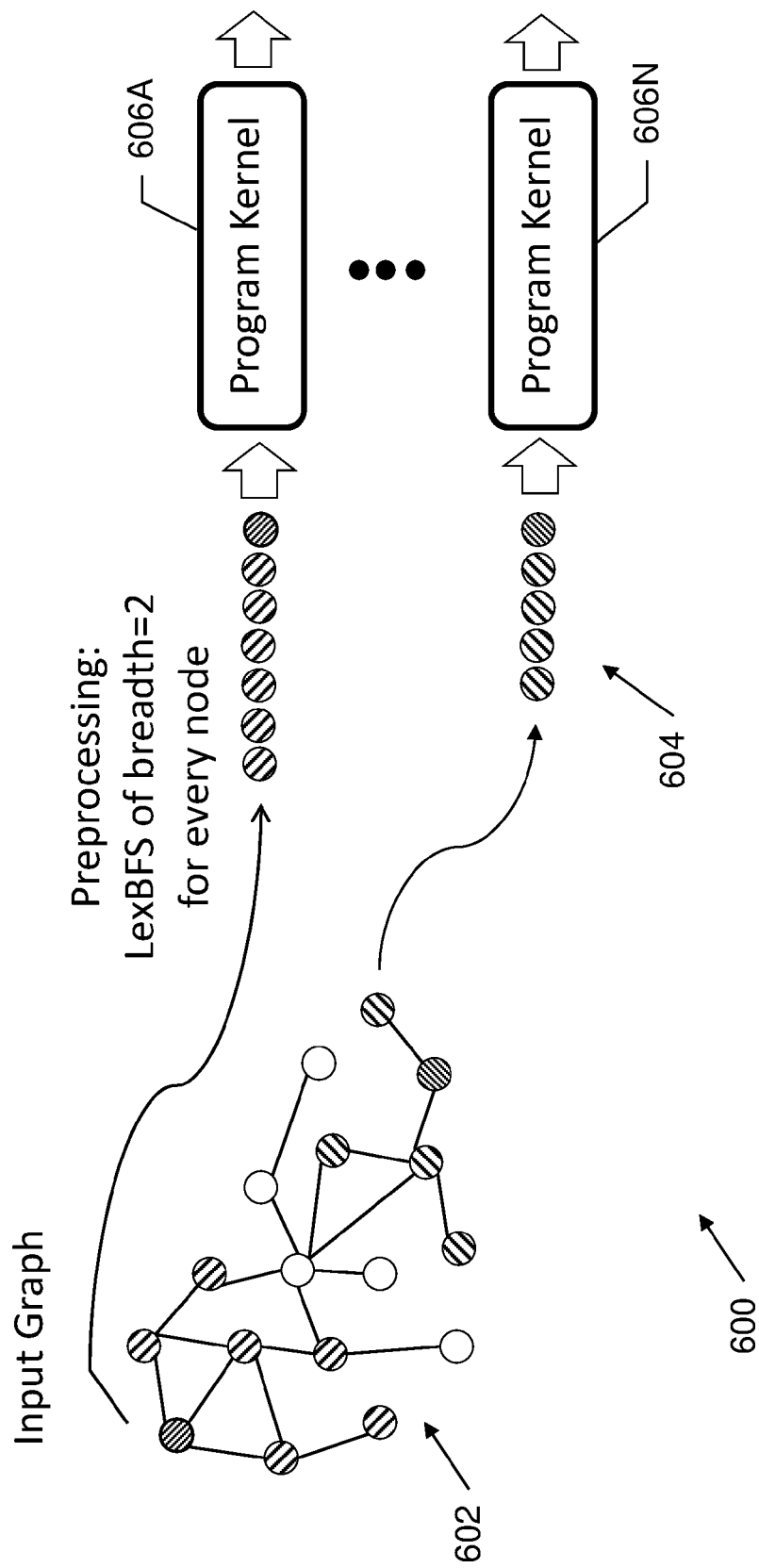
FIG. 6 is an exemplary data flow diagram of a LexBFS preprocessing of a graph.

An example of LexBFS pre-processing 600 is shown in FIG. 6. In this example, LexBFS pre-processing is performed for every node in the input graph 502. Since only nodes within 2 hops of a root node are necessary to find cliques, LexBFS pre-processing is performed up to a breadth of 2. LexBFS pre-processing of breadth=2 order is produced for every node in the graph. Each result 604 is a set of adjacency lists and is provided as input to a kernel 606A-N.

Figure 7:
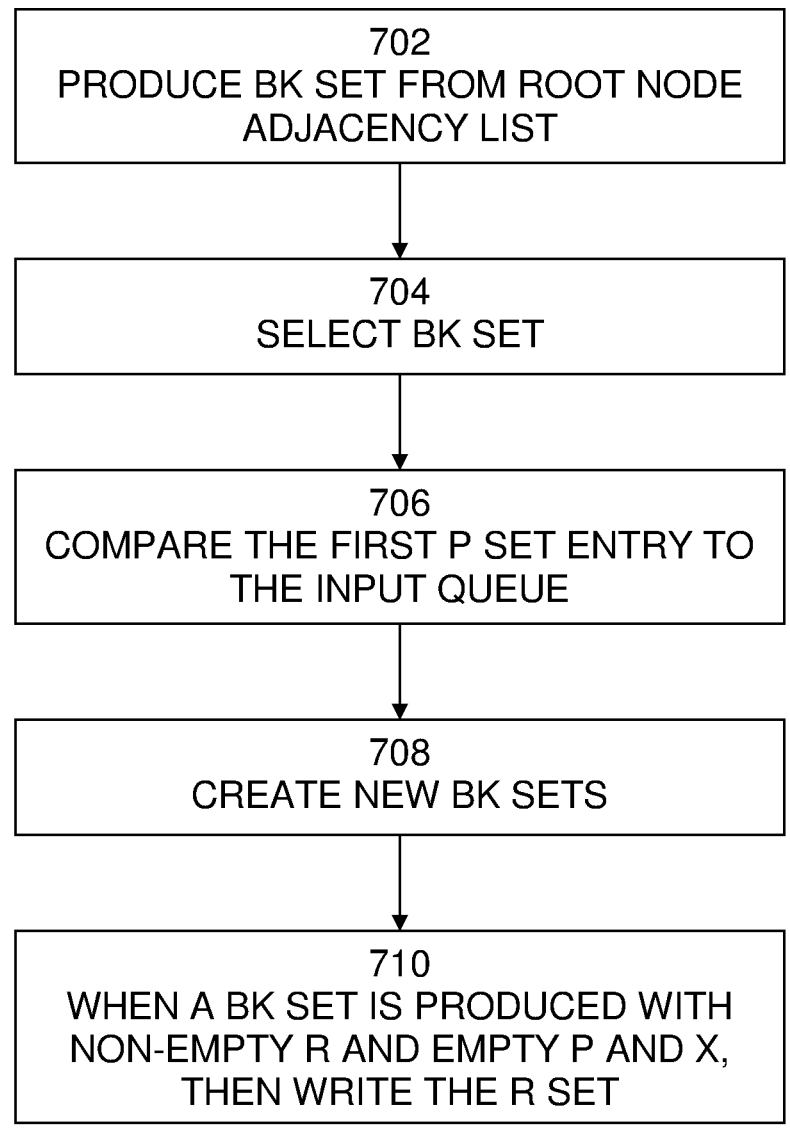
FIG. 7 is an exemplary flow diagram of a process of finding maximal cliques in a graph.
Figure 8:
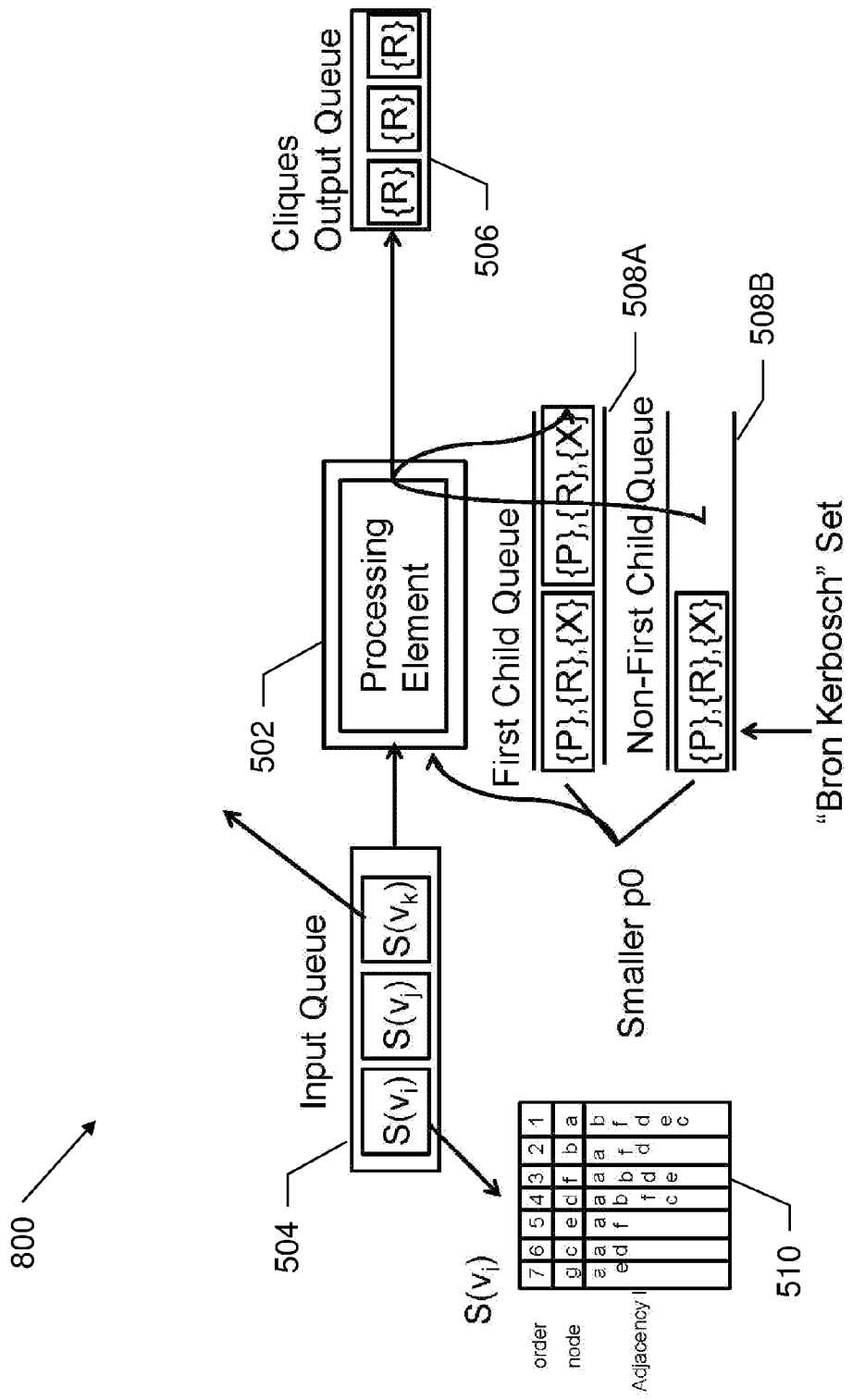
FIG. 8 is an exemplary data flow diagram of data processing in a processing kernel.

With the LexBFS order, the kernel can process the data in a streaming fashion to find maximal cliques. An example of a process 700 for finding maximal cliques is shown in FIG. 7. It is best viewed in conjunction with FIG. 8, which is a data flow diagram of data processing in a processing kernel 800. In this example, each kernel executes the Bron-Kerbosch method, maintaining R, P, and X sets. The kernel stores intermediate results in 1 of 2 queues. One queue 508A is for the "first child" of the node being processed. The other queue 508B is for the "non-first child" of the node being processed. The input 504 to process 700 is a set of adjacency lists produced by the LexBFS pre-processing. Each adjacency list is represented as a node ID followed by the node IDs of its neighbors. The adjacency lists are ordered according to the ordered determined by the LexBFS pre-processing. The input buffer 504 stores the input set $S_i$. The input set includes the adjacency lists for vertex $v_i$ and all neighbors of $v_i$. The nodes in the set are ordered according to the Lexicographic Breadth-first Search (LexBFS), with $v_i$ as the source node.

Process 700 begins with 702, in which the instant kernel 500, takes the first adjacency list $S(v_i)$, such as adjacency list 510, from input 504, that of the root node, and produces a single BK set, where the set R includes the root node, the set P includes all neighbors of the root node, and the set X is empty. The input buffer 504 may feed into a processing element 502. Processing element 502 may process one adjacency list, such as $S(v_i)$, from the input buffer 504 at a time. For each adjacency list of a given vertex, processing element 502 may output a first child set and a non-first child set. These sets feed into the two intermediate buffers 508A-B. One intermediate buffer 508A is for first children, the other intermediate buffers 508 is for non-first children. Both first child and non-first child sets are made up of a set R, P, and X. For clarity, the set of R, P, and X may be termed a Bron-Kerbosch (BK) set.

The following process repeats until both the first-child queue and non-first-child queue are empty:

In 704, a BK set is selected from one of the two queues 508A, 508B. If both queues 508A, 508B have BK sets, then select the BK set with the smaller first node in its P set. If both first P nodes are equal, then choose the first child queue 508A. If one of the two queues is empty, then choose the non-empty queue.

In 706, with the selected BK set, compare the first P node value to the input queue 504 of adjacency lists. Pop the adjacency lists off the front of the input queue 504 until the adjacency list is for that of the selected BK set's first value.

In 708, with the adjacency list for the BK set's first P node value, two new BK sets can be created. One BK set will be for the "first child" of the P node value and another BK set will be for the "non-first-child" of the P node value. The sets are created as follows, and pushed to the back of their respective queues.

The first child means that, in terms of the Bron-Kerbosch method, the first P node value will be "accepted" and moved from the candidate set P to the accepted set R. The set R gains the first P node value, the adjacency list from the input is used to compute the intersection of the P set and the P node value's neighbors, and X is the intersection of the previous X and p's neighbors.

The "non-first-child" set means that the first P node value was not accepted, so for the resulting BK set, R remains the same, P is less than the P node value, and X now contains that P node value.

In 710, when a BK set is produced with a non-empty R and an empty P and X, then write the R set to the output buffer 506, as it is a maximal clique.

The LexBFS ordering ensures all nodes and sets in this method are provided in correct order, eliminating the need for random access to the data. One or more embodiments use preprocessing to eliminate random access in the processing kernel, which is advantageous for parallel streaming computation with, for example, hardware accelerators. In one or more embodiments, the LexBFS is performed from every node (up to a depth of 2).

Figure 9:
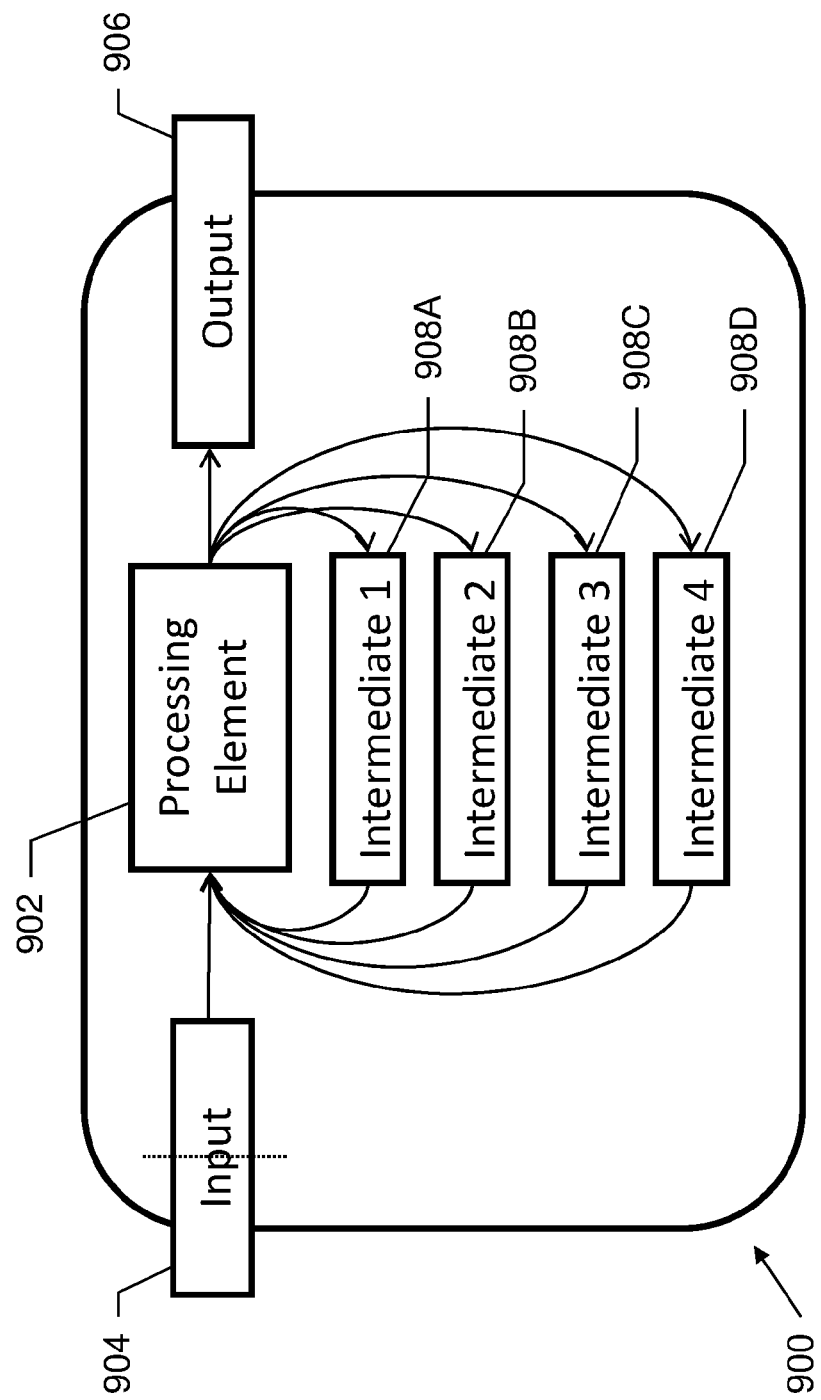
FIG. 9 is an exemplary block diagram of a processing kernel.

In one or more embodiments, preprocessing may be performed by executing LexBFS only once over the whole graph. The processing kernel for one or more embodiments may include additional elements. An example of such a kernel 900 is shown in FIG. 9. In this example, kernel 900 may include all components necessary to perform a desired computation, including the processor 902, input buffer 904, output buffer 906, a number of intermediate buffers 908A-D. In this example, input buffer 904 may be organized as a stack and intermediate buffers 908A-D may be organized as queues. A parallel system may have many kernels, and an embarrassingly parallel system has no interaction between kernels. Typically, the results of each kernel are aggregated.

In one or more embodiment, the labeling information from LexBFS may be re-used when providing input for the processing kernel. In one or more embodiment, LexBFS is only performed once, and then label information is used to construct the input into the processing kernel. The processing kernel for distinguishes between the depths of the vertices, and may use additional data structures.

In one or more embodiment, the input graph may be preprocessed to provide input to the processing kernels. The input to the processing kernels is a set of adjacency lists for a given node and all its neighbors (essentially providing neighbors of neighbors). An input set is generated for every node in the graph based on only a single traversal of the graph. The sets built by one or more embodiment may have fewer than or the same number of nodes as the sets built by other embodiments, and may be defined by more properties, including traversal depth.

Figure 10:
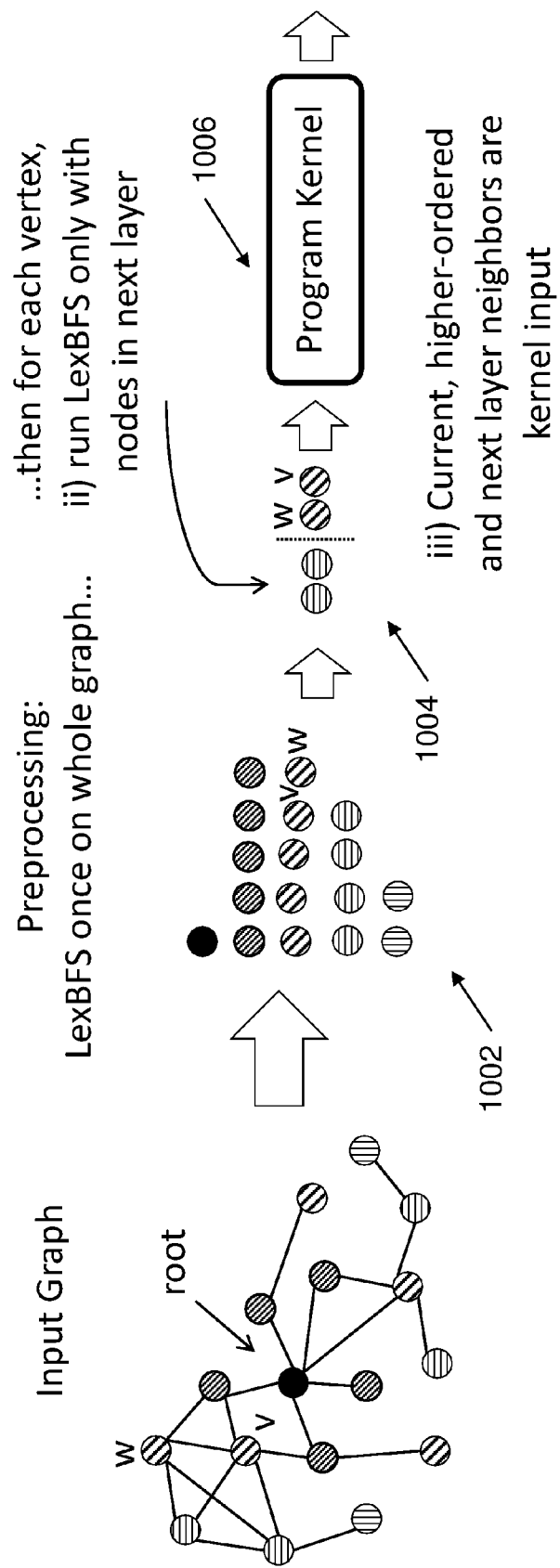
FIG. 10 is an exemplary data flow diagram of a LexBFS preprocessing of a graph.

For example, as shown in FIG. 10, LexBFS may be performed 1002 once from a randomly designated root node. The node data and LexBFS are augmented so that every node has its depth from the root node. After the traversal, an input set is built 1004 for each node. The input set consists of a given node and some of its neighbors. The neighbors that are included are neighbors that have either equal depth to the given node, or are in the next depth. Neighboring nodes from an earlier depth, as well as neighboring nodes of the same depth but having an earlier ordering, are not included in the input set. For neighbors of the same depth, the neighbors that are included must be ordered after the given node. All neighbors that are in the next depth are included in the input set 1006 for the processing kernel.

The neighbors of a given node that are in the same depth and have a lower ordering are in the correct LexBFS order, even though the given node was not the root node of the LexBFS traversal. This property allows redundant computation to be avoided. However, the neighboring nodes in the next depth are not inherently in the correct order. Next-level neighbors may be reorganized into LexBFS order by sorting, such as using a Radix sort.

Figure 11:
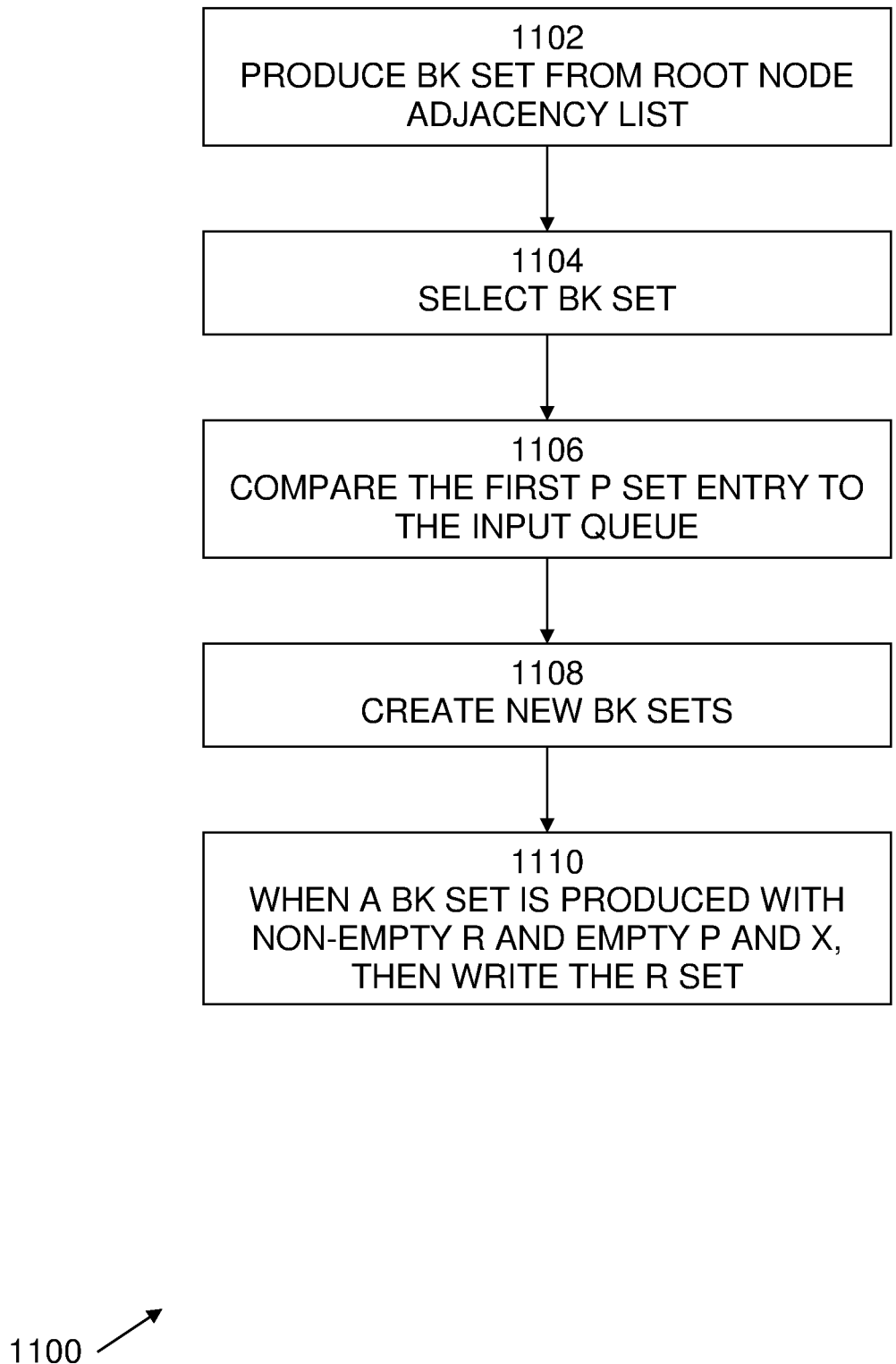
FIG. 11 is an exemplary flow diagram of a process of finding maximal cliques in a graph.

An example of a process 1100 for finding maximal cliques is shown in FIG. 11. It is best viewed in conjunction with FIG. 9. In this example, each kernel executes the Bron-Kerbosch method, maintaining R, P, and X sets. The kernel stores intermediate results in 1 of 4 queues. One queue 908A is for the first-children nodes in the same level as the input set's root node. Another queue 908B is for the non-first-children nodes in the same level as the root node. Another queue 908C is for the First-children nodes in the next level from the root node. Another queue 908D is for the non-first-children nodes in the next level from the root node. The input 904 to process 1100 is a set of adjacency lists produced by the LexBFS pre-processing.

Process 1100 begins with 1102, in which the instant kernel 900, takes the first adjacency list from input 904, that of the root node, and produces a single BK set, where the set R includes the root node, the set P includes all neighbors of the root node, and the set X is empty.

The following process repeats until both the "first-child" queue and "non-first-child" queue are empty:

In 1104, a BK set is selected from one of the four queues 908A, 908B, 908C, 908D. If the level of the node being processed is the same as the level of the root node, then queues 908A, 908B are used. If the level of the node being processed is the next level from the level of the root node, then queues 908C, 908D are used. If both queues 908A, 908B or 908C, 908D have BK sets, then select the BK set with the smaller first node in its P set. If both first P nodes are equal, then choose the first child queue 908A or 908C. If one of the two queues is empty, then choose the non-empty queue.

In 1106, with the selected BK set, compare the first P node value to the input queue 904 of adjacency lists. Pop the adjacency lists off the front of the input queue 904 until the adjacency list is for that of the selected BK set's first value.

In 1108, with the adjacency list for the BK set's first P node value, two new BK sets can be created. One BK set will be for the "first child" of the P node value and another BK set will be for the "non-first-child" of the P node value. The sets are created as follows, and pushed to the back of their respective queues.

The first child means that, in terms of the Bron-Kerbosch method, the first P node value will be "accepted" and moved from the candidate set P to the accepted set R. The set R gains the first P node value, the adjacency list from the input is used to compute the intersection of the P set and the P node value's neighbors, and X is the intersection of the previous X and p's neighbors.

The "non-first-child" set means that the first P node value was not accepted, so for the resulting BK set, R remains the same, P is less that P node value, and X now contains that P node value.

In 1110, when a BK set is produced with a non-empty R and an empty P and X, then write the R set to the output buffer 906, as it is a maximal clique.

Figure 12:
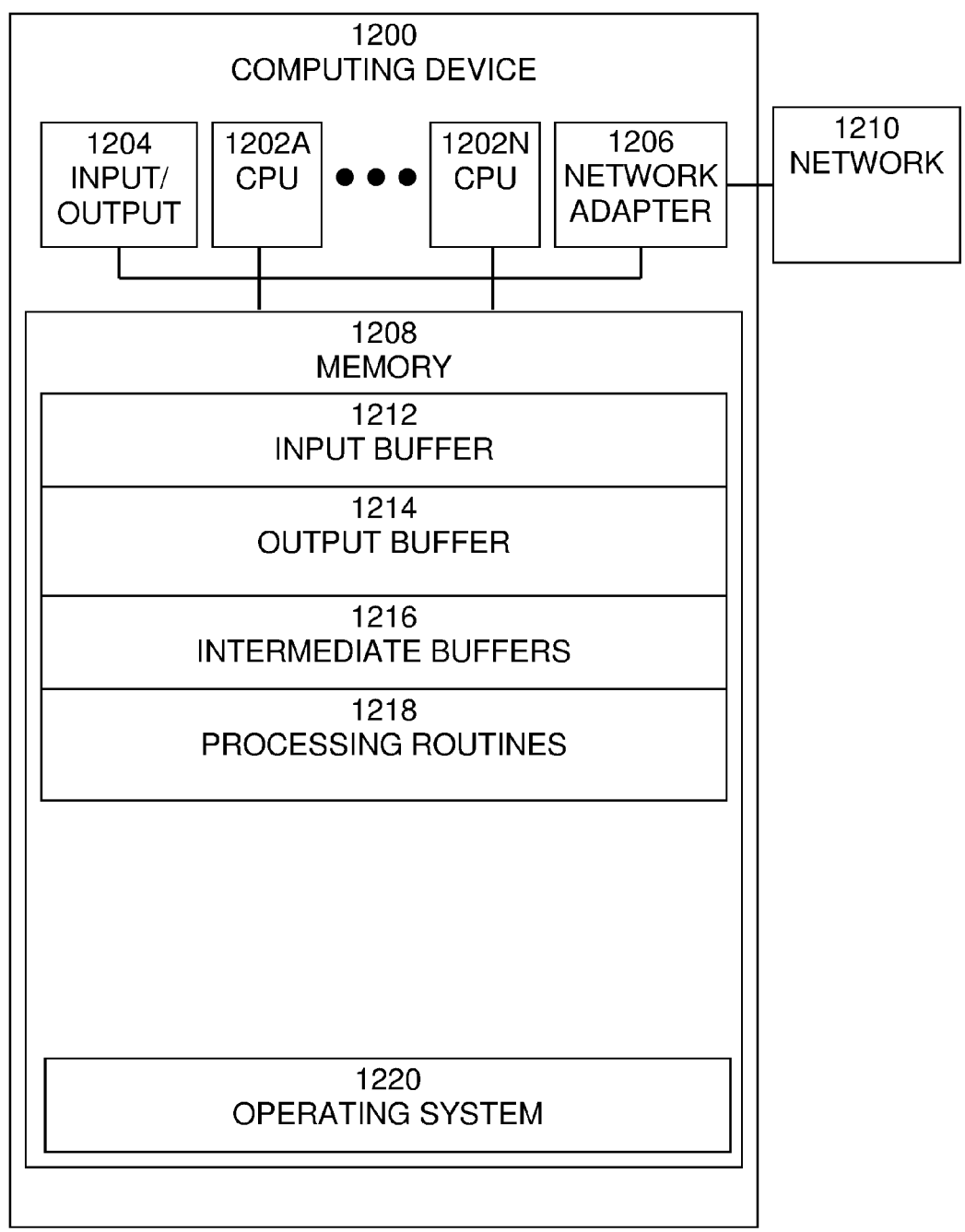
FIG. 12 is an exemplary block diagram of a computer system, in which the processes involved in the one or more embodiments described herein may be implemented.

An exemplary block diagram of a computer system (or computing device)1200, in which the processes involved in one or more embodiments described herein may be implemented, is shown in FIG. 12. Computer system 1200 may also be referred to herein as a processor system. Implementation in a computer system is merely one example of a technology with which the processes involved in one or more embodiments described herein may be implemented. Other exemplary technologies may include, but are not limited to, discrete circuitry, Field-Programmable Gate Arrays (FPGAs), Application Specific Integrated Circuits (ASICs), etc.

Computer system 1200 may be, for example, a programmed general-purpose computer system, such as a personal computer, workstation, server system, and minicomputer or mainframe computer. Other examples of computer systems may include Graphics Processing Units (GPUs) or other hardware or software implemented stream processors.

Computer system 1200 may include one or more processors (CPUs) 1202A-1202N, input/output circuitry 1204, network adapter 1206, and memory 1208. CPUs 1202A-1202N execute program instructions in order to carry out the functions of one or more embodiments of the present invention. Typically, CPUs 1202A-1202N are one or more microprocessors, such as an INTEL PENTIUM® processor. FIG. 12 illustrates one or more embodiments in which computer system 1200 is implemented as a single multi-processor computer system, in which multiple processors 1202A-1202N share system resources, such as memory 1208, input/output circuitry 1204, and network adapter 1206. However, the present invention also contemplates one or more embodiments in which computer system 1200 is implemented as a plurality of networked computer systems, which may be single-processor computer systems, multi-processor computer systems, or a mix thereof.

Input/output circuitry 1204 provides the capability to input data to, or output data from, computer system 1200. For example, input/output circuitry may include input devices, such as keyboards, mice, touchpads, trackballs, scanners, etc., output devices, such as video adapters, monitors, printers, etc., and input/output devices, such as, modems, etc. Network adapter 1206 interfaces device 1200 with a network 1210. Network 1210 may be any public or proprietary LAN or WAN, including, but not limited to the Internet.

Memory 1208 stores program instructions that are executed by, and data that are used and processed by, CPU 1202 to perform the functions of computer system 1200. Memory 1208 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1208 varies depending upon the function that computer system 1200 is programmed to perform. For example, as shown in FIG. 1, computer systems may perform a variety of roles in the system, method, and computer program product described herein. For example, computer systems may perform one or more roles as users, validators, auditors, and/or identity providers. In the example shown in FIG. 12, exemplary memory contents are shown representing routines for all of these roles. However, one of skill in the art would recognize that these routines, along with the memory contents related to those routines, may be included on one system, or may be distributed among a plurality of systems, based on well-known engineering considerations. One or more embodiments of the present invention contemplate any and all such arrangements.

In the example shown in FIG. 12, memory 1208 may include input buffer 1212, output buffer 1214, intermediate buffers 1216, processing routines 1218, and operating system 1224. Behavior monitoring routines 1212 may include routines to monitor behavior of users of one or more computer systems and store information on the monitored behaviors. Cluster generation/model training routines 1214 may include routines to assign users to clusters based on one or more features of the behaviors of the users. Labeling routines 1216 may include routines to receive labeling information that may be provided by a user to some members of the cluster. Anomaly score determination routines 1218 may include routines to raise anomaly scores of a user based on behaviors and labels of the user. Outlier detection routines 1220 may include routines to identify outlier users from clusters of user's behaviors and labels of the users. Alert generation routines 1222 may include routines to generate alerts indicate or otherwise inform the appropriate entities that outliers have been detected and that these outliers may represent security breaches. Operating system 1224 provides overall system functionality.

As shown in FIG. 12, one or more embodiments of the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for clique enumeration of graph data, the method comprising:
   receiving, using a processor system, data representing a graph comprising a plurality of nodes and a plurality of edgesI connecting at least some of the nodes;
   generating, using the processor system at least one adjacency list specifying nodes that are neighbors of a node based on the received data representing the graph, wherein the at least on adjacency list is generated by:
      generating for a node, a set of nodes including the node and all neighboring nodes;
      generating an ordering of the set of nodes including the node and all neighboring nodes by performing a lexicographic breadth-first search on the data representing the graph by selecting neighbors of nodes that have already been selected; and
      reordering nodes in the at least one adjacency list based on the generated ordering of the set of nodes; and
   generating, based on the at least one adjacency list, at least one maximal clique, wherein the at least one maximal clique specifies at least one set of nodes in which every node is connected to every other node and to which no additional node can be added with every node still being connected to every other node.

2. The method of claim 1, wherein the at least one maximal clique is generated by constructing and traversing a search tree through a single sequential pass on the at least one adjacency list.

3. The method of claim 2, wherein the at least one adjacency list is generated so as to enable the at least one maximal clique to be generated in one single sequential pass.

4. The method of claim 2, wherein the at least one maximal clique is generated by:
   for each adjacency list of a root node, generating a first child set and a non-first child set, wherein each first child set and a non-first child set comprises a first set of chosen nodes, a second set of nodes that may be chosen, and a third set of nodes that cannot be chosen;
   repeating until no first child sets and no non-first child sets remain:

selecting a first child set or a non-first child set of a selected node that is a neighbor of the root node;

attempting to generate a new first child set for the selected node by moving at least one node from the second set of nodes to the first set of nodes;

attempting to generate a new non-first child set for the selected node by moving at least one node from the second set of nodes to the third set of nodes; and when a new first child set or a new non-first child set is generated in which both the second set of nodes and the third set of nodes are empty, outputting the first set of nodes as a maximal clique.

5. The method of claim 2, wherein the at least one maximal clique is generated by:

for each adjacency list of a root node, generating a first child set of nodes of the same level as the root node, a non-first child set of nodes of the same level as the root node, a first child set of nodes of the next level from the root node, a non-first child set of nodes of the next level from the root node, wherein each first child set and a non-first child set comprises a first set of chosen nodes, a second set of nodes that may be chosen, and a third set of nodes that cannot be chosen;

repeating until no first child sets and no non-first child sets remain:

selecting a first child set or a non-first child set of a selected node that is a neighbor of the root node, wherein when the level of the selected node is the same as the level of the root node, the first child set of nodes of the same level as the root node and the non-first child set of nodes of the same level as the root node are selected from, and when the level of the selected node is the next level from the level of the root node, the first child set of nodes of the next level from the root node and the non-first child set of nodes of the next level from the root node are selected from;

attempting to generate a new first child set for the selected node by moving at least one node from the second set of nodes to the first set of nodes;

attempting to generate a new non-first child set for the selected node by moving at least one node from the second set of nodes to the third set of nodes; and when a new first child set or a new non-first child set is generated in which both the second set of nodes and the third set of nodes are empty, outputting the first set of nodes as a maximal clique.

6. The method of claim 5, wherein the at least one adjacency list is generated by:

generating for a node, a set of nodes including the node and neighboring nodes that are of the same level of the node or are of the next level from the node, and not including neighboring nodes of an earlier level or neighboring nodes of the same level but having an earlier ordering;

generating an ordering of the set of nodes including the node and neighboring nodes by performing a breadth-first search on the data representing the graph by selecting neighbors of nodes that have already been selected; and reordering nodes in the at least one adjacency list based on the generated ordering of the set of nodes.

7. A computer system for clique enumeration of graph data comprising:

a plurality of processing kernels, each processing kernel comprising processing circuitry, input memory configured to store input to the processing kernel, output memory configured to store output from the processing kernel, and a plurality of intermediate memories configured to store intermediate processing data, wherein the processing circuitry is configured to:

receive data representing a graph comprising a plurality of nodes and a plurality of edges connecting at least some of the nodes;

generate at least one adjacency list specifying nodes that are neighbors of a node based on the received data representing the graph, wherein the at least on adjacency list is generated by:

generating for a node, a set of nodes including the node and all neighboring nodes;

generating an ordering of the set of nodes including the node and all neighboring nodes by performing a lexicographic breadth-first search on the data representing the graph by selecting neighbors of nodes that have already been selected; and reordering nodes in the at least one adjacency list based on the generated ordering of the set of nodes; and generate, based on the at least one adjacency list, at least one maximal clique, wherein the at least one maximal clique specifies at least one set of nodes in which every node is connected to every other node and to which no additional node can be added with every node still being connected to every other node.

8. The apparatus of claim 7, wherein the at least one maximal clique is generated by constructing and traversing a search tree through a single sequential pass on the at least one adjacency list.

9. The apparatus of claim 8, wherein the at least one adjacency list is generated so as to enable the at least one maximal clique to be generated in one single sequential pass.

10. The apparatus of claim 8, wherein the at least one maximal clique is generated by:

for each adjacency list of a root node, generating a first child set and a non-first child set, wherein each first child set and a non-first child set comprises a first set of chosen nodes, a second set of nodes that may be chosen, and a third set of nodes that cannot be chosen;

repeating until no first child sets and no non-first child sets remain:

selecting a first child set or a non-first child set of a selected node that is a neighbor of the root node;

attempting to generate a new first child set for the selected node by moving at least one node from the second set of nodes to the first set of nodes;

attempting to generate a new non-first child set for the selected node by moving at least one node from the second set of nodes to the third set of nodes; and when a new first child set or a new non-first child set is generated in which both the second set of nodes and the third set of nodes are empty, outputting the first set of nodes as a maximal clique.

11. The system of claim 8, wherein the at least one maximal clique is generated by:

for each adjacency list of a root node, generating a first child set of nodes of the same level as the root node, a non-first child set of nodes of the same level as the root node, a first child set of nodes of the next level from the root node, a non-first child set of nodes of the next level from the root node, wherein each first child set and a non-first child set comprises a first set of chosen nodes, a second set of nodes that may be chosen, and a third set of nodes that cannot be chosen;

repeating until no first child sets and no non-first child sets remain:

selecting a first child set or a non-first child set of a selected node that is a neighbor of the root node, wherein when the level of the selected node is the same as the level of the root node, the first child set of nodes of the same level as the root node and the non-first child set of nodes of the same level as the root node are selected from, and when the level of the selected node is the next level from the level of the root node, the first child set of nodes of the next level from the root node and the non-first child set of nodes of the next level from the root node are selected from;

attempting to generate a new first child set for the selected node by moving at least one node from the second set of nodes to the first set of nodes;

attempting to generate a new non-first child set for the selected node by moving at least one node from the second set of nodes to the third set of nodes; and when a new first child set or a new non-first child set is generated in which both the second set of nodes and the third set of nodes are empty, outputting the first set of nodes as a maximal clique.

12. The system of claim 11, wherein the at least one adjacency list is generated by:

generating for a node, a set of nodes including the node and neighboring nodes that are of the same level of the node or are of the next level from the node, and not including neighboring nodes of an earlier level or neighboring nodes of the same level but having an earlier ordering;

generating an ordering of the set of nodes including the node and neighboring nodes by performing a breadth-first search on the data representing the graph by selecting neighbors of nodes that have already been selected; and reordering nodes in the at least one adjacency list based on the generated ordering of the set of nodes.

13. A computer program product for clique enumeration of graph data, the computer program product comprising a non-transitory computer readable storage having program instructions embodied therewith, the program instructions executable by a computer, to cause the computer to perform a method comprising:

generating at least one adjacency list specifying nodes that are neighbors of a node based on the received data representing the graph, wherein the at least on adjacency list is generated by:

generating for a node, a set of nodes including the node and all neighboring nodes;

generating an ordering of the set of nodes including the node and all neighboring nodes by performing a lexicographic breadth-first search on the data representing the graph by selecting neighbors of nodes that have already been selected; and reordering nodes in the at least one adjacency list based on the generated ordering of the set of nodes; and generating, based on the at least one adjacency list, at least one maximal clique, wherein the at least one maximal clique specifies at least one set of nodes in which every node is connected to every other node and to which no additional node can be added with every node still being connected to every other node.

14. The computer program product of claim 13, wherein the at least one maximal clique is generated by constructing and traversing a search tree through a single sequential pass on the at least one adjacency list, an, wherein the at least one adjacency list is generated so as to enable the at least one maximal clique to be generated in one single sequential pass.

15. The computer program product of claim 14, wherein the at least one maximal clique is generated by:

for each adjacency list of a root node, generating a first child set and a non-first child set, wherein each first child set and a non-first child set comprises a first set of chosen nodes, a second set of nodes that may be chosen, and a third set of nodes that cannot be chosen;

repeating until no first child sets and no non-first child sets remain:

selecting a first child set or a non-first child set of a selected node that is a neighbor of the root node;

attempting to generate a new first child set for the selected node by moving at least one node from the second set of nodes to the first set of nodes;

attempting to generate a new non-first child set for the selected node by moving at least one node from the second set of nodes to the third set of nodes; and when a new first child set or a new non-first child set is generated in which both the second set of nodes and the third set of nodes are empty, outputting the first set of nodes as a maximal clique.

16. The computer program product of claim 14, wherein the at least one maximal clique is generated by:

for each adjacency list of a root node, generating a first child set of nodes of the same level as the root node, a non-first child set of nodes of the same level as the root node, a first child set of nodes of the next level from the root node, a non-first child set of nodes of the next level from the root node, wherein each first child set and a non-first child set comprises a first set of chosen nodes, a second set of nodes that may be chosen, and a third set of nodes that cannot be chosen;

repeating until no first child sets and no non-first child sets remain:

selecting a first child set or a non-first child set of a selected node that is a neighbor of the root node, wherein when the level of the selected node is the same as the level of the root node, the first child set of nodes of the same level as the root node and the non-first child set of nodes of the same level as the root node are selected from, and when the level of the selected node is the next level from the level of the root node, the first child set of nodes of the next level from the root node and the non-first child set of nodes of the next level from the root node are selected from;

attempting to generate a new first child set for the selected node by moving at least one node from the second set of nodes to the first set of nodes;

attempting to generate a new non-first child set for the selected node by moving at least one node from the second set of nodes to the third set of nodes; and when a new first child set or a new non-first child set is generated in which both the second set of nodes and the third set of nodes are empty, outputting the first set of nodes as a maximal clique.

17. The computer program product of claim 16, wherein the at least one adjacency list is generated by:

generating for a node, a set of nodes including the node and neighboring nodes that are of the same level of the node or are of the next level from the node, and not including neighboring nodes of an earlier level or neighboring nodes of the same level but having an earlier ordering;

generating an ordering of the set of nodes including the node and neighboring nodes by performing a breadth-first search on the data representing the graph by selecting neighbors of nodes that have already been selected; and reordering nodes in the at least one adjacency list based on the generated ordering of the set of nodes.

\* \* \* \* \*